US008419063B2

(12) United States Patent
Beierl

(10) Patent No.: US 8,419,063 B2
(45) Date of Patent: Apr. 16, 2013

(54) CONVERTIBLE VEHICLE

(75) Inventor: Dominik Beierl, Korntal-Muenchingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/192,114

(22) Filed: Jul. 27, 2011

(65) Prior Publication Data

US 2012/0025506 A1    Feb. 2, 2012

(30) Foreign Application Priority Data

Jul. 28, 2010  (DE) .......................... 10 2010 036 675

(51) Int. Cl.
*B60R 21/13*  (2006.01)

(52) U.S. Cl.
USPC ........................................................ 280/756

(58) Field of Classification Search .................... 280/756
See application file for complete search history.

(56) References Cited

U.S. PATENT DOCUMENTS

| 7,896,422 | B2 * | 3/2011 | Willard et al. ........... 296/107.09 |
| 2008/0122210 | A1 * | 5/2008 | Liesaus et al. ................ 280/756 |
| 2009/0152854 | A1 | 6/2009 | Beierl et al. |

FOREIGN PATENT DOCUMENTS

| DE | 10 2006 023 502 B3 | 2/2008 |
| DE | 102005025363 B4 | 6/2008 |
| EP | 1127751 A1 | 8/2001 |
| EP | 2343221 A1 | 7/2011 |
| FR | 2 894 208 A1 | 6/2007 |
| WO | 2007/065989 A1 | 6/2007 |

* cited by examiner

*Primary Examiner* — Eric Culbreth
(74) *Attorney, Agent, or Firm* — RatnerPrestia

(57) ABSTRACT

A convertible has at least one rollover protective structure, in particular a roll bar, which is extendable through an opening which is closable by a covering. In order to further optimize the opening movement of the covering during the extension of the rollover protective structure of the convertible, the covering is attached to a bodywork part with the aid of a multi-bar linkage which controls the opening movement of the covering.

12 Claims, 4 Drawing Sheets

CONVERTIBLE VEHICLE

CROSS-REFERENCE TO RELATED APPLICATION

This application claims the priority, under 35 U.S.C. §119, of German application DE 10 2010 036 675.7, filed Jul. 28, 2010; the prior application is herewith incorporated by reference in its entirety.

BACKGROUND OF THE INVENTION

Field of the Invention

The invention relates to a convertible with at least one rollover protective structure, in particular a roll bar, which is extendable through an opening which is closable by a covering.

Published, French patent application FR 2 894 208 A1 discloses a covering for an opening in a trim panel, the covering being held in a closed position by a clip connection or latching connection. The covering is opened by extension of a roll bar, the covering being held on the trim panel by a strap.

SUMMARY OF THE INVENTION

It is accordingly an object of the invention to provide a convertible which overcomes the above-mentioned disadvantages of the prior art devices of this general type, which optimizes the opening movement of a covering during the extension of a rollover protective structure of a convertible.

The object is achieved in a convertible with at least one rollover protective structure, in particular a roll bar, which is extendable through an opening which is closable by a covering in that the covering is attached to a bodywork part with the aid of a multi-bar linkage which controls the opening movement of the covering. A defined and reproducible opening movement is ensured in a simple manner by the multi-bar linkage. According to one aspect of the invention, the multi-bar linkage is a two-bar linkage, but may also be, for example, a four-bar linkage.

A preferred exemplary embodiment of the convertible is characterized in that the multi-bar linkage contains a bar which is coupled to a rear end region of the covering. Within the context of the present invention, the terms rear and front relate to a forward direction of travel of the convertible. The multi-bar linkage is preferably coupled to the lower side of the covering.

Another preferred exemplary embodiment of the convertible is characterized in that the bar has at least one contact surface with which the rollover protective structure, upon being extended, comes into contact in such a manner that the covering opens up the opening through which the rollover protective structure extends. The opening movement of the covering, which opening movement is controlled by the multi-bar linkage, is triggered in a simple manner by the rollover protective structure. This has the advantage that a separate triggering mechanism for opening the covering can be omitted.

Another preferred exemplary embodiment of the convertible is characterized in that the bar has two contact surfaces spaced apart laterally from each other for the rollover protective structure. This reduces the risk of the covering and/or of the multi-bar linkage tilting or jamming.

Another preferred exemplary embodiment of the convertible is characterized in that the bar is of substantially U-shaped design. The bar which is of substantially U-shaped design is coupled at one free end to the covering. At the other free end thereof, the bar which is of substantially U-shaped design is coupled to a bodywork part of the motor vehicle in such a manner that the covering, upon being opened, can be moved out of the region of the opening. For this purpose, the concave side of the bar of U-shaped design faces the opening when the covering is closed.

Another preferred exemplary embodiment of the convertible is characterized in that the multi-bar linkage is configured as a four-bar linkage with a rear bar which is arranged between two front bars which are coupled to a front end region of the covering. The front bars are preferably configured to be curved to a greater extent than the rear bar.

Another preferred exemplary embodiment of the convertible is characterized in that the front bars are coupled further forward and closer to the bodywork part than the rear bar. This optimizes the opening movement of the covering, which opening movement is controlled by the four-bar linkage.

Another preferred exemplary embodiment of the convertible is characterized in that the bar or the bars is or are configured and coupled in such a manner that, upon being opened, the covering moves forward under a relatively flat enveloping surface or envelope. This affords the advantage that the opening movement of the covering is not adversely affected by a rear window which can be arranged at a small distance above the covering.

Another preferred exemplary embodiment of the convertible is characterized in that the bar or the bars is or are coupled to two frame parts which are fastened to the bodywork part. The frame parts may be connected integrally to the bodywork part.

Another preferred exemplary embodiment of the convertible is characterized in that the bodywork part to which the covering is attached is a convertible top compartment lid which contains the opening through which the rollover protective structure is extendable. The covering serves to close a receiving space for the rollover protective structure as long as the rollover protective structure is in the retracted position thereof.

Another preferred exemplary embodiment of the convertible is characterized in that the covering contains a covering flap which constitutes a means for coupling the multi-bar linkage, in particular the four-bar linkage. This simplifies the production of the multi-bar linkage, in particular the four-bar linkage.

Other features which are considered as characteristic for the invention are set forth in the appended claims.

Although the invention is illustrated and described herein as embodied in a convertible, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
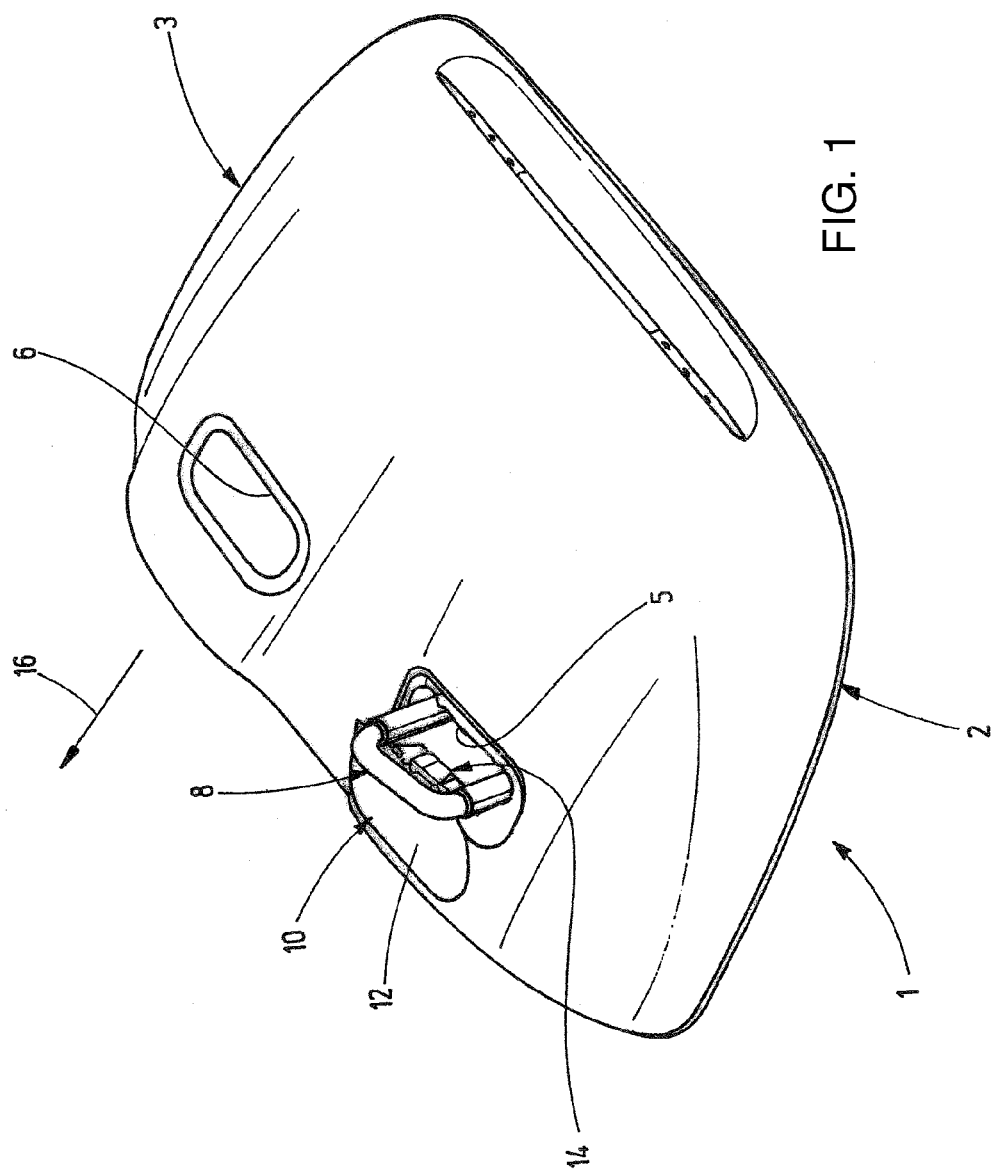
FIG. 1 is a diagrammatic, perspective view of a convertible top compartment lid of a convertible obliquely from the rear according to the invention.

Referring now to the figures of the drawing in detail and first, particularly, to FIGS. 1-4 thereof, there is shown a convertible 1 with a rear region 2 in various views. A convertible top compartment lid 3 which has openings 5, 6 permitting the passage of rollover protective structure elements is arranged in the rear region 2 of the convertible 1. A roll bar 8 which is extendable from a retracted position into an extended rollover protection position protrudes from the opening 5.

When the roll bar 8 is in the non-illustrated retracted position thereof, the opening 5 is closed with a covering 10 in order to prevent dust or dirt from penetrating through the opening 5 into a receiving space, which is arranged below the convertible top compartment lid, for the roll bar 8. The covering 10 has a covering flap 12 which is coupled to the convertible top compartment lid 3 with the aid of a four-bar linkage 14.

FIG. 1 indicates a forward direction of travel of the convertible 1 by an arrow 16. When the roll bar 8 is in its extended position illustrated, the covering flap 12 is arranged in front of the roll bar 8 in the forward direction of travel 16.

Figure 2:
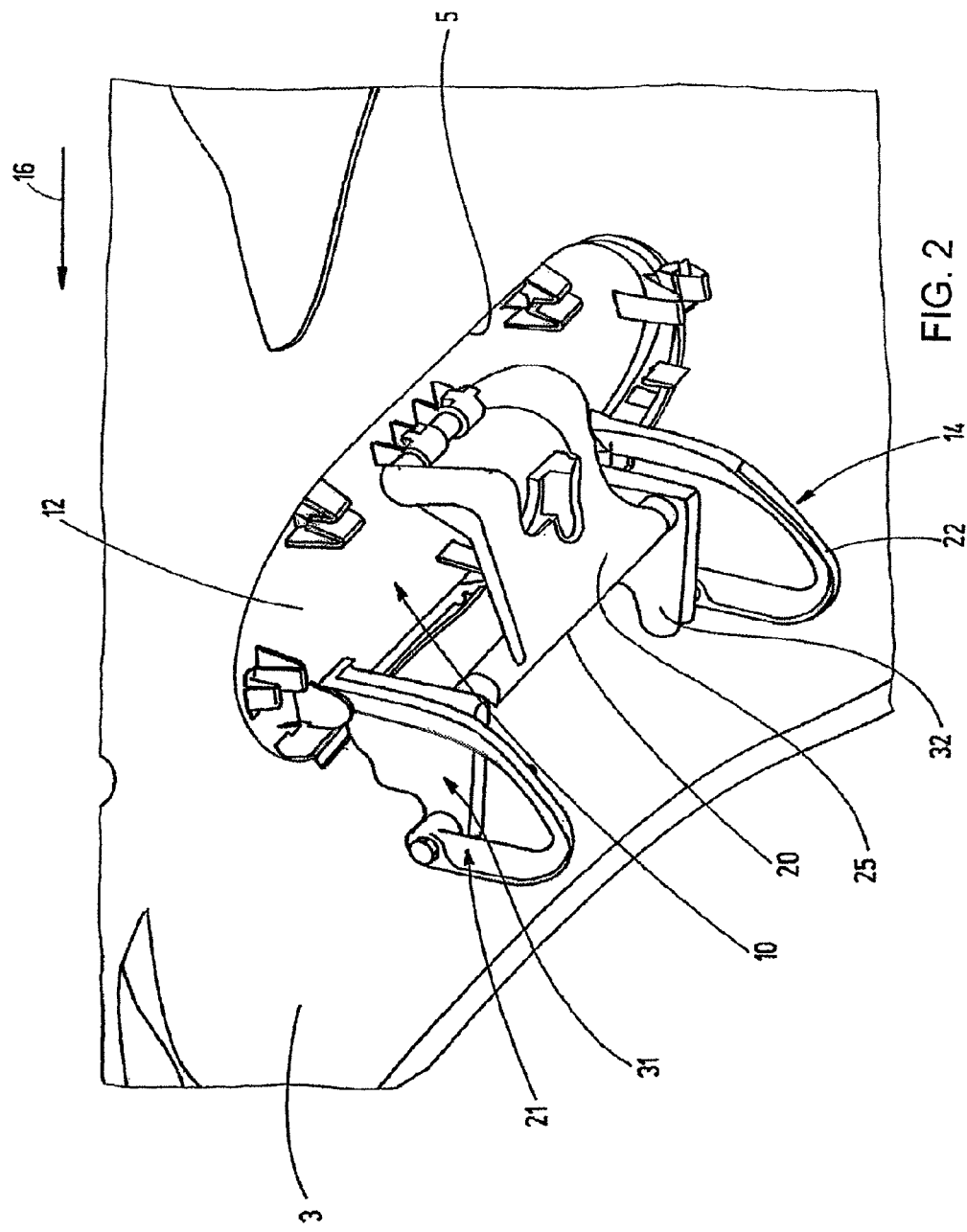
FIG. 2 is a diagrammatic, perspective view of a four-bar linkage with which a covering is coupled to a lower side of the convertible top compartment lid from FIG. 1.

It is seen in FIG. 2 that the four-bar linkage 14 includes a rear bar 20 and two front bars 21, 22. A contact surface 25 for the roll bar is provided on the rear bar 20. The contact surface 25 merges into two contact surfaces which are spaced apart laterally from each other and are formed on the rear bar 20.

The rear bar 20 is coupled at one end to two frame parts 31, 32. The other end of the rear bar 20 is coupled to a rear end region of the covering 10. Furthermore, one end of a front bar 21, 22 is coupled to each of the two frame parts 31, 32.

The two front bars 21, 22 are of curved design and are arranged to the sides of the rear bar 20. The other ends of the front bars 21, 22 of the four-bar linkage 14 are coupled to a front end region of the covering 10. The covering 10 itself together with the covering flap 12 constitutes a means of coupling the four-bar linkage 14.

Figure 3:
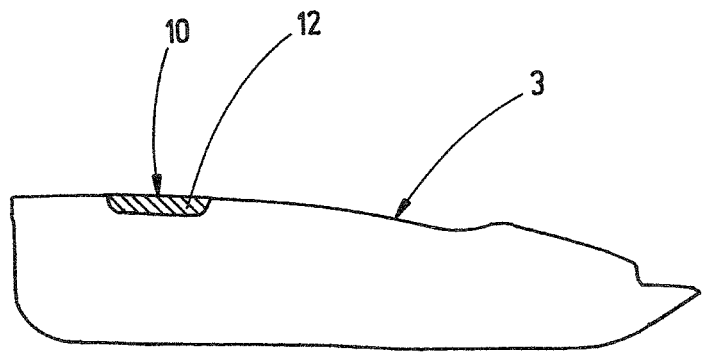
FIG. 3 is a side view of the convertible top compartment lid from FIGS. 1 and 2 with the covering closed.

FIG. 3 illustrates the covering 10 in the closed position thereof in a side view or in section. If the roll bar arranged below the covering 10 is extended, the roll bar strikes against the contact surfaces on the lower side of the covering 10 and pushes the latter open. The opening movement of the covering 10 is controlled here by the four-bar linkage 14.

Figure 4:
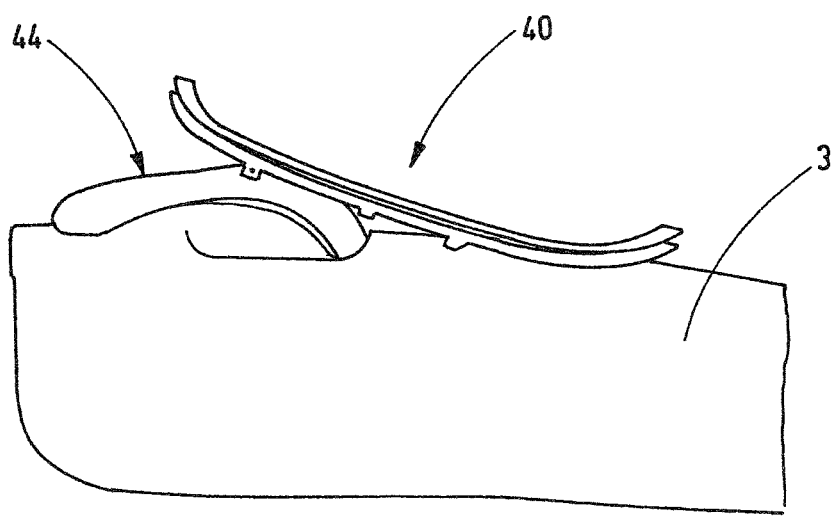
FIG. 4 is a side view as in FIG. 3 with an enveloping surface of the opening movement of the covering.

FIG. 4 illustrates an enveloping surface 44 of the opening movement of the covering flap. By means of the four-bar linkage, the enveloping surface 44 can be designed to be flat enough such that the opening movement of the covering is not adversely affected by a rear window 40 which is arranged at a small distance above the opening through which the roll bar extends. The flat envelope curve 44 is achieved in particular by the rear bar 20 being designed to be relatively short.

Figure 5:
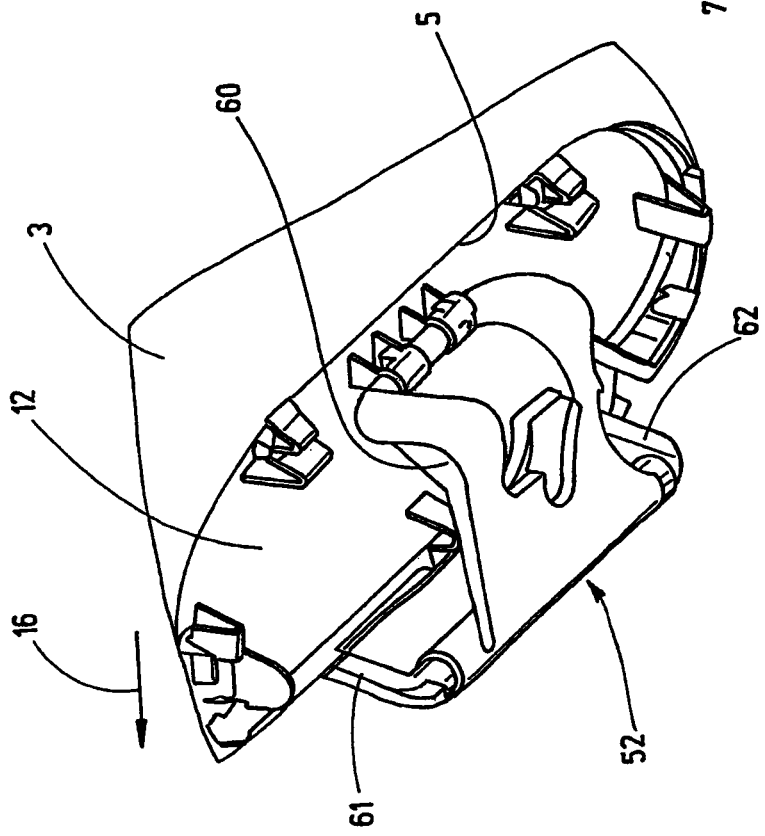
FIG. 5 is a perspective view as in FIG. 2 according to another exemplary embodiment with a two-bar linkage.

FIG. 5 illustrates a similar exemplary embodiment as in FIG. 2, which contains a two-bar linkage 52 instead of the four-bar linkage 14 in FIG. 2. The two-bar linkage 52 contains a bar 60 which has two limbs bent away from each other. A free end of the bar 60 is coupled to two frame parts 61, 62 which are fastened to the convertible top compartment lid 3. The other end of the bar 60 is coupled to a rear region of the covering 10.

Like the rear bar 20 in FIG. 2, the bar 60 contains a contact surface or two contact surfaces spaced apart laterally from each other for the roll bar. Within the context of the present invention, it has been found that the desired opening movement of the covering 10 or of the covering flap 12 may also be produced with the aid of the two-bar linkage 52 and without the front bars 21, 22 from FIG. 2.

Figure 6:
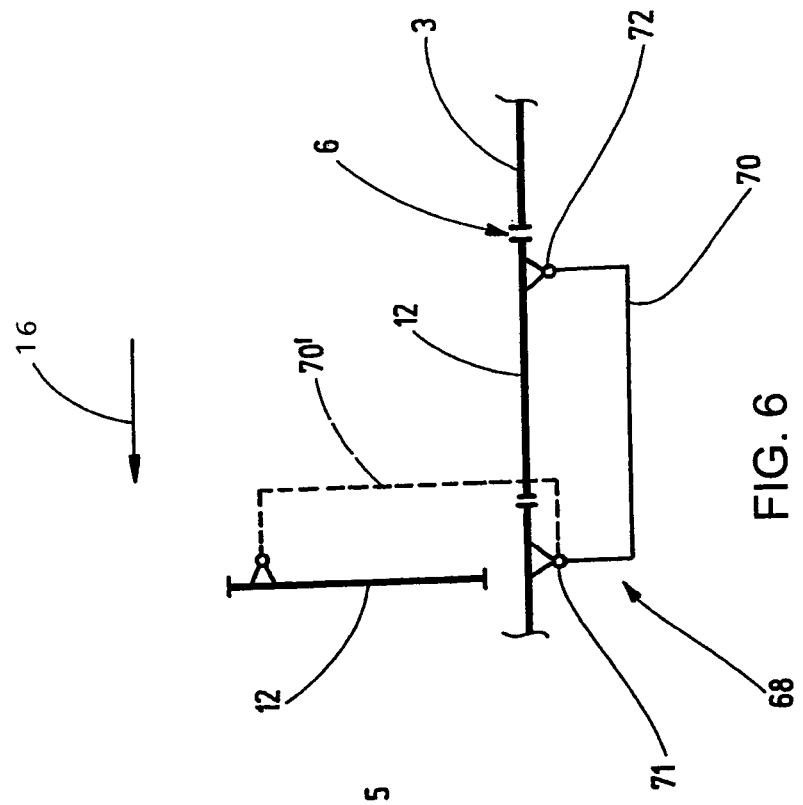
FIG. 6 is a greatly simplified schematic illustration of a similar exemplary embodiment as in FIG. 5.

FIG. 6 illustrates a similar two-bar linkage 68 as in FIG. 5 in a greatly simplified view from the side. The two-bar linkage 68 contains a substantially U-shaped bar 70 which has a base from which two limbs are bent, in particular at right angles. One of the limbs is coupled at the free end thereof to the convertible top compartment lid 3 at a first coupling point 71. The other limb 70 is coupled at the free end thereof to the rear end region of the covering flap 12 at a second coupling point 72.

When the covering 12 is closed, the base of the bar 70 of U-shaped design is arranged substantially parallel to the covering flap 12. The open position of the covering flap 12 is likewise illustrated in FIG. 6 by a bar 70' illustrated by dashed lines. When the covering flap 12 is open, the base of the bar 70' of U-shaped design is arranged perpendicularly to the bodywork part 3. When the link 70' is in the open position thereof, the covering 12 is arranged laterally offset with respect to and not above the opening 6, and therefore a roll bar can extend through the opening 6 without the extension movement being obstructed by the covering 12 or the bar 70'.

The invention claimed is:

1. A convertible, comprising:
a bodywork part having an opening formed therein;
at least one rollover protective structure being extendable through said opening;
a multi-bar linkage; and
a covering for closing said opening, said covering attached to said bodywork part with an aid of said multi-bar linkage, said linkage controlling an opening movement of said covering, wherein said multi-bar linkage includes a bar coupled to a rear end region of said covering, and wherein said bar has at least one contact surface with which said rollover protective structure, upon being extended, comes into contact in such a manner that said covering opens up said opening through which said rollover protective structure extends.

2. The convertible according to claim 1, wherein said bar has two contact surfaces spaced apart laterally from each other for said rollover protective structure.

3. The convertible according to claim 1, wherein said bar is of substantially U-shaped design.

4. The convertible according to claim 1, wherein said multi-bar linkage is a four-bar linkage with two front bars and said rear bar disposed between said two front bars, said two front bars coupled to a front end region of said covering.

5. The convertible according to claim 4, wherein said front bars are coupled further forward and closer to said bodywork part than said rear bar.

6. The convertible according to claim 4, wherein said front bars and said rear bar are designed and coupled in such a manner that, upon being opened, said covering moves forward under a relatively flat enveloping surface.

7. The convertible according to claim 4, further comprising two frame parts fastened to said bodywork, said front bars and said rear bar being coupled to said two frame parts.

8. The convertible according to claim 1, wherein said bar is designed and coupled in such a manner that, upon being opened, said covering moves forward under a relatively flat enveloping surface.

9. The convertible according to claim 1, further comprising two frame parts fastened to said bodywork, said bar coupled to said two frame parts.

10. The convertible according to claim 1, wherein said bodywork part to which said covering is attached is a convertible top compartment lid which contains said opening through which said rollover protective structure is extendable.

11. The convertible according to claim 1, wherein said covering comprises a covering flap which constitutes a means of coupling said multi-bar linkage.

12. The convertible according to claim 1, wherein said at least one rollover protective structure is a roll bar.

* * * * *